United States Patent [19]

Rausch

[11] Patent Number: 5,568,375
[45] Date of Patent: Oct. 22, 1996

[54] METHOD FOR PREVENTING AN OVERLOAD WHEN STARTING A MULTICOMPUTER SYSTEM AND MULTICOMPUTER SYSTEM FOR CARRYING OUT SAID METHOD

[75] Inventor: Dieter Rausch, Karlsruhe, Germany

[73] Assignee: Alcatel N.V., Rijswijk, Netherlands

[21] Appl. No.: 486,076

[22] Filed: Jun. 7, 1995

[30] Foreign Application Priority Data

Jul. 22, 1994 [DE] Germany ............ 44 26 001.6

[51] Int. Cl.$^6$ ............ G05B 15/00; G05B 19/18
[52] U.S. Cl. ............ 364/131; 395/200.01
[58] Field of Search ............ 364/131, 132, 364/133, 138; 395/200

[56] References Cited

U.S. PATENT DOCUMENTS

| | | | |
|---|---|---|---|
| Re. 33,521 | 1/1991 | Mori et al. | 395/280 |
| 4,888,683 | 12/1989 | Koizumi et al. | 364/200 |
| 5,062,147 | 10/1991 | Pickett et al. | 395/183.22 |

FOREIGN PATENT DOCUMENTS

| | | | |
|---|---|---|---|
| 0602791 | 6/1994 | European Pat. Off. | 364/704 |
| 3004827 | 11/1985 | Germany . | |

OTHER PUBLICATIONS

"ITT 1240 Digital Exchange Hardware Description", S. Das et al, *Electrical Communication*, vol. 56, No. 2/3, 1981, pp. 135–147.

*Primary Examiner*—Roy N. Envall, Jr.
*Assistant Examiner*—Karen D. Presley
*Attorney, Agent, or Firm*—Ware, Fressola, Van Der Sluys & Adolphson

[57] ABSTRACT

In a multicomputer system (MRS) with a central computer (ZR), a number of peripheral computers (PR0, ..., PR29) signal their availability to the central computer (ZR) when starting or restarting the system. It is possible that overload situations occur during this process. According to the invention, a computer-dependent signal delay ($V_{PR}$) of the availability is provided for each peripheral computer (PR0, ..., PR29) within a predetermined time interval (T). Each peripheral computer has a specific computer number ($n_{PR}$). All peripheral computers (PR0, ..., PR29) should have signaled their availability within the predetermined time interval (T). For this purpose, the maximum number ($n_{max}$) of peripheral computers (PR0, ..., PR29) must be known and the central computer (ZR) must be able to process simultaneously an available quantity (A) of peripheral computers (PR0, ..., PR29) that signal their availability. In this case, the computer-dependent signal delay ($V_{PR}$)=computer number ($n_{PR}$) MODULO time interval (T).

10 Claims, 2 Drawing Sheets

METHOD FOR PREVENTING AN OVERLOAD WHEN STARTING A MULTICOMPUTER SYSTEM AND MULTICOMPUTER SYSTEM FOR CARRYING OUT SAID METHOD

TECHNICAL FIELD

The present invention pertains to a method for preventing an overload when starting or restarting a multicomputer system and a multicomputer system for carrying out said method.

BACKGROUND OF THE INVENTION

One such multicomputer system is known from the article "System 12, Hardware Structure" by S. Das et al., published in Electrical Communication, Vol. 56, No. 2/3, 1981, pages 135–147. The multicomputer system described in the aforementioned article discloses several peripheral computers that respectively represent a module control unit for a terminal module and are connected to a digital coupling network that fulfills the function of a computer communication network. A functional control unit that is also connected to the digital coupling network corresponds to a central computer.

In such a multicomputer system, the peripheral computers signal their availability to the central computers when the system is started. This can cause overload situations which in turn lead to losses of the availability signal as well as deadlock.

DISCLOSURE OF INVENTION

Consequently, the present invention is based on the objective of preventing overload situations when starting a multicomputer system.

According to the invention, a method for preventing an overload when starting a multicomputer system that comprises n peripheral computers connected to a computer communication network is characterized by the fact that the n peripheral computers respectively signal their availability to the central computer via the computer communication network after an instruction to start the system and after a peripheral-computer-dependent signal delay, and that these availability signals which are transmitted from the peripheral computers to the central computer are completed after a predetermined time interval.

In further accord with the invention, a multicomputer system comprising n peripheral computers and a central computer connected to a computer communication network is characterized by the fact that the peripheral computers are provided with a control means that controls the peripheral computers based on instructions stored in memories in such a way that the n peripheral computers respectively signal their availability to the central computer via the computer communication network after an instruction to start the system and after a peripheral-computer-dependent signal delay, and that these availability signals which are transmitted from the n peripheral computers to the central computer are completed after a predetermined time interval.

The invention advantageously insures that the availability signals which are transmitted from the peripheral computers to the central computer of the multicomputer system are completed after a predetermined time interval.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
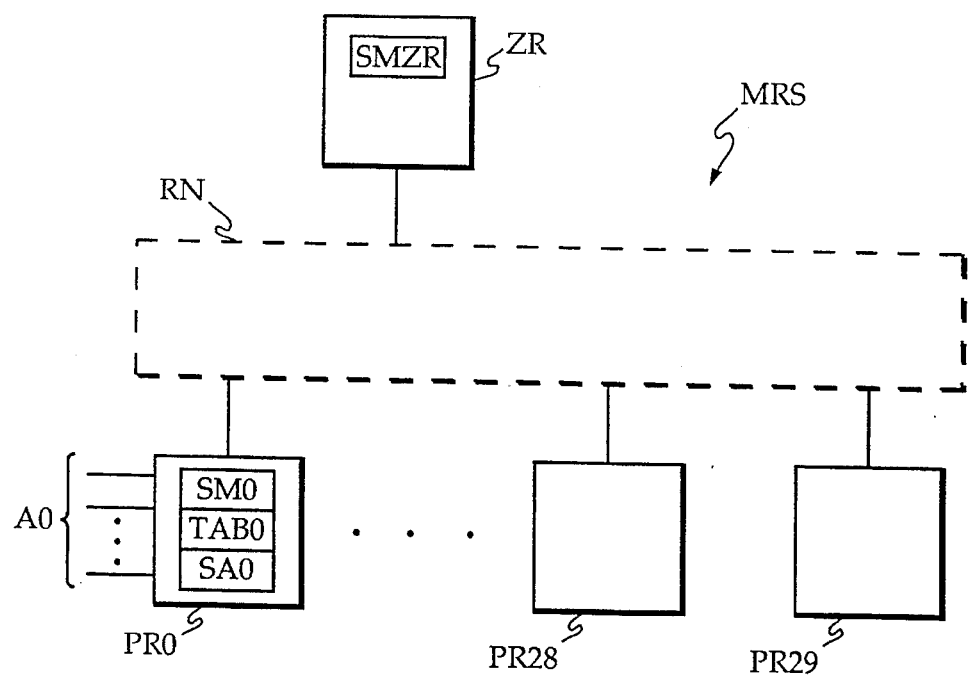
FIG. 1 shows one embodiment of a multicomputer system according to the invention.

FIG. 1 shows one embodiment of a multicomputer system MRS. The multicomputer system MRS contains a computer communication network RN to which n= 30 peripheral computers PR0, . . . , PR28, PR29 and one central computer ZR are connected. The number n=30 peripheral computers was chosen arbitrarily and should only be interpreted as an example. It is also possible to connect several central computers to the computer communication network. The computer communication network RN can be a LAN (Local Area Network), an ATM (Asynchronous Transfer Mode) high-speed data network, a digital coupling network or a different computer communication network that is able to transmit data between the connected peripheral computers and the central computer.

In the embodiment shown, the peripheral computers PR0, . . . , PR29 are of identical design. The detailed description of the peripheral computer PR0 with its components that are essential for the invention is representative of all other peripheral computers. The peripheral computer PR0 contains a number of connecting lines A0 to which additional computers or terminals can be connected. In addition, the peripheral computer PR0 is provided with control means SM0 and a device TAB0 for storing a table. The peripheral computer PR0 is also provided with a memory SA0 in which instructions that are carried out by the control means SM0 are stored. The table stored in the device TAB0 contains information about the status of the connecting lines A0. In this case, the term status can identify, for example, the type of connecting line, the availability and the file status. The central computer ZR also contains control means SMZR and a memory in which instructions are stored that the control means SMZR need to carry out.

Figure 2:
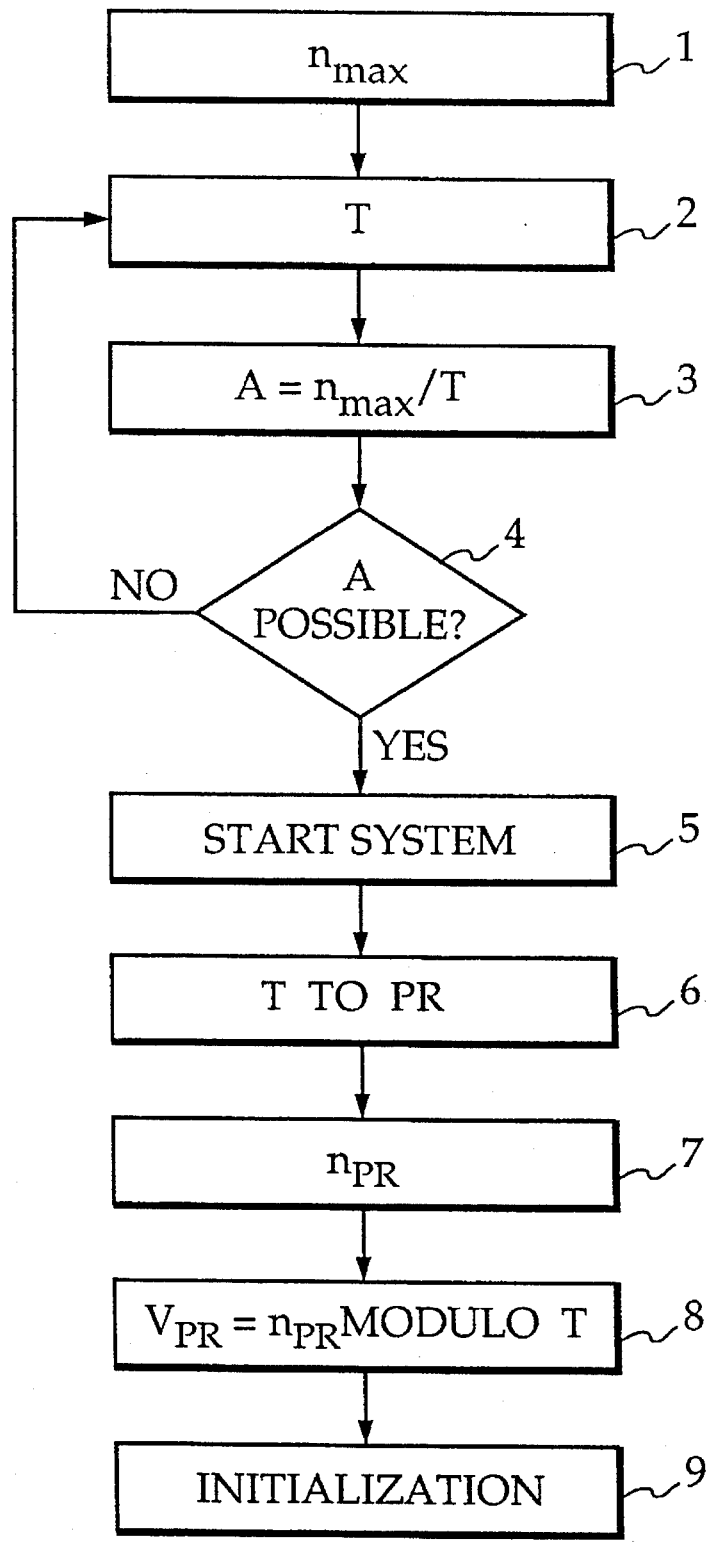
FIG. 2 shows a functional diagram of a first embodiment of the method according to the invention.

FIG. 2 shows a functional diagram of the first embodiment of the method according to the invention which is carried out in the multicomputer system MRS according to FIG. 1. When starting or restarting the multicomputer system MRS, the peripheral computers PR0, . . . , PR29 signal their availability and the availability of their connecting lines to the central computer ZR. This process is also called initialization.

In step 1, the maximum number $n_{max}$ of peripheral computers PR contained in the multicomputer system MRS is predetermined. This can also be carried out by the computer operator who is able to enter instructions or data into the multicomputer system MRS via an input device. This input device can be either directly connected to the computer communication network RN or the central computer ZR. In step 2, a time interval T, within which the start of the system with the initialization of all peripheral computers PR0, . . .

, PR29 must be completed, is predetermined. The predetermination of the time interval T can also be carried out by the operator via the input device. In a subsequent step 3, an available quantity A=($n_{max}$ divided by T) is calculated. This available quantity A indicates how many availability Signals that are transmitted from the peripheral computers PR0, . . . , PR29 to the central computer ZR must be simultaneously processed when starting the system in a subsequent step 4, it is determined whether the central computer ZR is able to process this available quantity A. If the central computer is unable to process this available quantity, the central computer returns to step 2 and the predetermined time interval T is changed, i.e., it is increased. If it is determined in step 4 that the central computer ZR is able to process the available quantity A, an instruction to start the system is generated in step 5. This instruction to start the system can also be entered by the operator via the input device. However, it is also possible to issue this instruction automatically after step 4. Steps 1–4 are carried out by the central computer ZR. In step 6, the time interval T is transmitted from the central computer ZR to the peripheral computers PR0, . . . , PR29 via the computer communication network RN. It is also possible to carry out steps 1–4 in the central computer ZR not at the beginning of the method according to the invention, but to have previously executed steps 1–4 when implementing the method according to the invention, and to have predetermined the time interval T in the instructions that are stored in the memories of the peripheral computers PR0, . . . , PR29 and processed by the control means. In this case, step 6 is eliminated. A determination of specific computer numbers $n_{PR}$ is carried out in step 7. Each of the peripheral computers PR0, PR29 reads its address in the multicomputer system MRS, with said address in the simplest instance consisting of a consecutive numbering of the peripheral computers from $n_{PR}=1$ through $n_{PR}=30$. In a subsequent step 8, a computer-dependent signal delay $V_{PR}$ is determined for each of the peripheral computers PR0, . . . , PR29, with the computer having to initialize itself in dependence on this signal delay. The computer-dependent signal delays $V_{PR}$ are obtained from $V_{PR}=n_{PR}$ MODULO T. After the calculation of the computer-dependent signal delays $V_{PR}$ in step 7, each of the peripheral computers PR0, . . . , PR29 signals its availability and the availability of its connecting lines A that is stored in the devices TAB to the central computers ZR in accordance with its signal delay $V_{PR}$ in step 8. When utilizing the method according to this invention, it is insured that the initialization of the peripheral computers PR0, . . . , PR29 in the form of the availability signals is completed within the time internal T. In the present embodiment of the multicomputer system MRS, n=30 peripheral computers PR0, . . . , PR29 are connected to the computer communication network RN. The maximum number $n_{max}$ of peripheral computers contained in the multicomputer system MRS is also $n_{max}=30$. A time interval T=10 sec is predetermined. This results in an available quantity A=3/sec, i.e., the central computer ZR must process 3 availability signals from the peripheral computers PR0, . . . , PR29 simultaneously.

Figure 3:
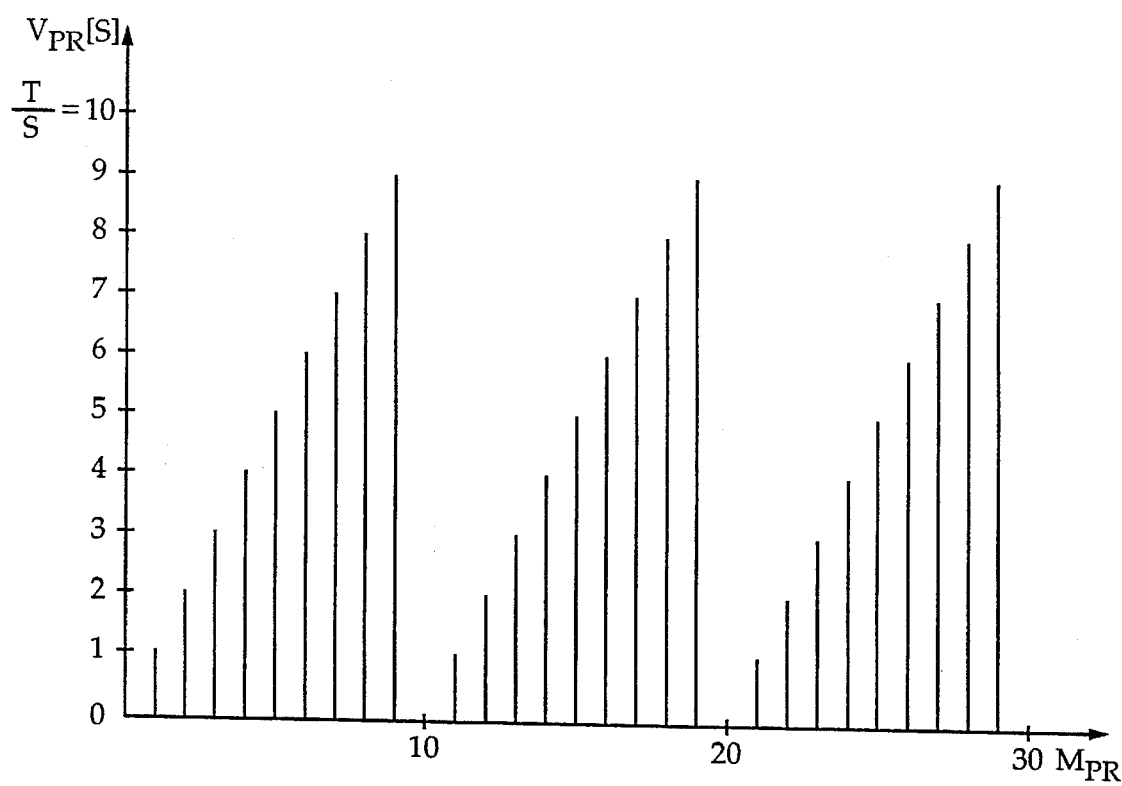
FIG. 3 shows an illustration of the signal delays of the peripheral computers in the multicomputer system according to the invention which is illustrated in FIG. 1.

FIG. 3 shows an illustration of the signal delays $V_{PR}$ of the peripheral computers PR0, . . . , PR29 contained in the multicomputer system MRS according to the invention which is illustrated in FIG. 1. The n=30 peripheral computers PR0, . . . , PR29 are plotted on the abscissa of the coordinate system. The signal delay $V_{PR}$ is plotted on the ordinate of the coordinate system. If one forms an envelope around the discrete values, one can clearly ascertain the sawtooth progression of the curve indicating the signal delays $V_{PR}$ which begins at the signal delay $V_{PR}=0$ sec of the peripheral computers PR0, PR10 and PR20 and ends at the signal delays $V_{PR}=9$ sec of the peripheral computers PR9, PR19 and PR29. One can also ascertain the available quantity A=3/sec that the central computer ZR must process simultaneously. The entire initialization process is completed after the predetermined time interval T=10 sec.

According to a second embodiment of the method according to the invention, it is proposed that the peripheral computers PR0, . . . , PR29 be assigned with their computer-dependent signal delay $V_{PR}$ by the central computer ZR. For this purpose, the determination of the specific computer numbers $n_{PR}$ is carried out in the central computer ZR after the instruction to start the system is generated in step 5 according to FIG. 2. Subsequently, the computer-dependent signal delays $V_{PR}$ are determined by the central computer ZR. These computer-dependent signal delays $V_{PR}$ are subsequently assigned to the peripheral computers PR0, . . . , PR29 via the computer communication network RN. The peripheral computers PR0, . . . , PR29 subsequently signal their availability in accordance with their computer-dependent signal delay $V_{PR}$ to the central computer ZR.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. Method for preventing an overload when starting a multicomputer system (MRS) that comprises n peripheral computers (PR0, . . . , PR29) and a central computer (ZR), with the n peripheral computers (PR0, . . . , PR29) and the central computer (ZR) connected to a computer communication network (RN), wherein the n peripheral computers (PR0, . . . , PR29) respectively signal their availability to the central computer (ZR) by means of availability signals Via the computer communication network (RN) after an instruction to start the system (5) and after a peripheral-computer-dependent signal delay ($V_{PR}$), and wherein the availability signals which are transmitted from the n peripheral computers (PR0, . . . , PR29) to the central Computer (ZR) are completed after a predetermined time interval (T).

2. Method according to claim 1, wherein a specific computer number ($n_{PR}$) is assigned to each of the n peripheral computers (PR0, . . . , PR29) in the multicomputer system (MRS), and wherein the peripheral-computer-dependent signal delay ($V_{PR}$) is determined in accordance with the following formula:

$$\text{peripheral-computer-dependent signal delay } (V_{PR}) = \text{specific computer number } (n_{PR}) \text{ MODULO time interval } (T).$$

3. Method according to claim 1, wherein a maximum number ($n_{max}$) of the peripheral computers (PR0, . . . , PR29) contained in the multicomputer system (MRS) is predetermined, that an available quantity (A) is determined by dividing the maximum number ($n_{max}$) of peripheral computers (PR0, . . . , PR29) contained in the multicomputer system (MRS) by the predetermined time interval (T), wherein it is determined whether the central computer (ZR) is able to simultaneously process the availability signals from a number of peripheral computers (PR0, . . . , PR29) that correspond to this available quantity (A), and wherein the predetermined time interval (T) is changed if the central computer (ZR) is unable to simultaneously process the number of peripheral computers (PR0, . . . , PR29) that corresponds to the available quantity (A).

4. Method according to claim 2, wherein each of the peripheral computers (PR0, . . . , PR29) receives the predetermined time interval (T) from the central computer (ZR) via the computer communication network (RN), wherein each of the peripheral computers (PR0, ..., PR29) determines its specific computer number ($n_{PR}$), and wherein each of the peripheral-computers (PR0, ..., PR29) subsequently determines its peripheral computer-dependent signal delay ($V_{PR}$).

5. Method according to claim 2, wherein the central computer (ZR) determines the specific computer number ($n_{PR}$) of the n peripheral computers (PR0, ..., PR29), wherein the central computer determines the peripheral-computer-dependent signal delays ($V_{PR}$) by means of the predetermined time interval (T), and wherein the central computer (ZR) instructs each of the peripheral computers (PR0, ..., PR29) to transmit its availability signal in accordance with its peripheral-computer-dependent signal delay ($V_{PR}$).

6. Multicomputer system (MRS) comprising n peripheral computers (PR0, ..., PR29) and a central computer (ZR), with the n peripheral computers (PR0, ..., PR29) and the central computer (ZR) connected to a computer communication network (RN), wherein the peripheral computers (PR0, ..., PR29) are provided with control means (SM0) that control the peripheral computers (PR0, ..., PR29) based on instructions stored in memories (SA0) in such a way that the n peripheral computers (PR0, PR29) respectively signal their availability to the central computer (ZR) via the computer communication network (RN) after an instruction to start the system (5) and after a peripheral-computer-dependent signal delay ($V_{PR}$), and wherein the availability signals which are transmitted from the n peripheral computers (PR0, ..., PR29) to the central computer (ZR) are completed after a predetermined time interval (T).

7. Multicomputer system according to claim 6, wherein a specific computer number ($n_{PR}$) is assigned to each of the n peripheral computers (PR0, ..., PR29), and wherein the peripheral-computer-dependent signal delay ($V_{PR}$) is determined in accordance with the following formula:

peripheral-computer-dependent signal delay ($V_{PR}$) =specific computer number ($n_{PR}$) MODULO time interval (T).

8. Method according to claim 2, wherein a maximum number ($n_{max}$) of the peripheral computers (PR0, ..., PR29) contained in the multicomputer system (MRS) is predetermined, that an available quantity (A) is determined by dividing the maximum number ($n_{max}$) of peripheral computers (PR0, ..., PR29) contained in the multicomputer system (MRS) by the predetermined time interval (T), wherein it is determined whether the central computer (ZR) is able to simultaneously process the availability signals from a number of peripheral computers (PR0, ..., PR29) that correspond to this available quantity (A), and wherein the predetermined time interval (T) is changed if the central computer (ZR) is unable to simultaneously process the number of peripheral computers (PR0, ..., PR29) that corresponds to the available quantity (A).

9. Method according to claim 3, wherein each of the peripheral computers (PR0, ..., PR29) receives the predetermined time interval (T) from the central computer (ZR) via the computer communication network (RN), wherein each of the peripheral computers (PR0, ..., PR29) determines its specific computer number ($n_{PR}$), and wherein each of the peripheral computers (PR0, ..., PR29) subsequently determines its peripheral computer-dependent signal delay ($V_{PR}$).

10. Method according to claim 3, wherein the central computer (ZR) determines the specific computer number ($n_{PR}$) of the n peripheral computers (PR0, ..., PR29), wherein the central computer determines the peripheral-computer-dependent signal delays ($V_{PR}$) by means of the predetermined time interval (T), and wherein the central computer (ZR) instructs each of the peripheral computers (PR0, ..., PR29) to transmit its availability signal in accordance with its peripheral-computer-dependent signal delay ($V_{PR}R$).

* * * * *

UNITED STATES PATENT AND TRADEMARK OFFICE
CERTIFICATE OF CORRECTION

PATENT NO.   : 5,568,375
DATED        : October 22, 1996
INVENTOR(S)  : D. Rausch It is certified that error appears in the above-indentified patent and that said Letters Patent is hereby corrected as shown below:

Title page, item [56], line 7, please cancel "364/704"; and at column 5, line 26, please cancel "(PR0, PR29)" and substitute --(PR0, ..., PR29)-- therefor.

At column 4, line 35, please cancel "Via"and substitute --via-- therefor; and at line 40, please cancel "Computer" and substitute --computer-- therefor.

Signed and Sealed this

Eleventh Day of February, 1997

Attest:

BRUCE LEHMAN

*Attesting Officer*   *Commissioner of Patents and Trademarks*